United States Patent [19]
Ishihara

[11] Patent Number: 4,804,711
[45] Date of Patent: Feb. 14, 1989

[54] MELT BLENDING OF A CARBOXY TERMINATED POLYSTYRENE OLIGOMER WITH AN AROMATIC POLYESTER

[75] Inventor: Toshio Ishihara, Oyadai, Japan

[73] Assignee: General Electric Company, Mt. Vernon, Ind.

[21] Appl. No.: 113,050

[22] Filed: Oct. 26, 1987

[51] Int. Cl.$^4$ ............................................. C08L 69/00
[52] U.S. Cl. .................................... 525/146; 525/177; 525/439; 525/445; 525/468
[58] Field of Search .................. 525/439, 445, 468, 92, 525/146, 177

[56] References Cited

U.S. PATENT DOCUMENTS 4,267,096  5/1981  Bussink et al. .................. 525/439 X
4,657,980  4/1987  Fujita et al. .......................... 525/146

Primary Examiner—Theodore E. Pertilla
Attorney, Agent, or Firm—Martin B. Barancik

[57] ABSTRACT

A process which comprises mixing a melt of an amorphous aromatic polyester with a melt of a carboxy terminated polystyrene oligomer, said oligomer having a number average molecular weight of from about 500 to 10,000.

29 Claims, No Drawings

MELT BLENDING OF A CARBOXY TERMINATED POLYSTYRENE OLIGOMER WITH AN AROMATIC POLYESTER

BACKGROUND OF THE INVENTION

Amorphous aromatic polyesters are well known in the polymeric art. They are generally characterized by the repeating unit carboxy ester

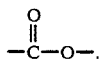

Aromatic polyesters are of particular importance and have many useful applications. Examples of aromatic amorphous polyesters for this invention include polycarbonates, copolyestercarbonates, polyarylates and polycycloalkylene phthalates.

Generally speaking aromatic polycarbonate resins offer a high resistance to the attack of mineral acids, may be easily molded, are physiologically harmless as well as strain resistant. It is also well known that polycarbonate resins have high impact strength below a critical thickness of between about ⅛ and ¼ inch. Additionally polycarbonates are transparent and process at relatively high temperatures with the appropriate melt viscosities.

Copolyestercarbonates are generally quite similar to polycarbonate in properties but generally have a higher secondary transition temperature (Tg) than the comparable polycarbonates. Polyarylates are generally quite similar to the copolyestercarbonates in properties but have a still higher secondary transition temperature than the copolyestercarbonates.

Common to all these amorphous aromatic polyesters are the rather high processing temperatures accompanied by the relatively high melt viscosities. This is particularly true of the polycarbonates, copolyestercarbonates and polyarylates. Many processing aids have been introduced to lower the processing temperature and melt viscosities. However, all of them meet with some undesired effects. The polystyrenes have been used as processing upgraders, however the amorphous aromatic polyesters generally loose their tensile elongation and oftentimes will also become embrittled when polystyrenes are present. Other properties which can be affected are the clarity and the appearance of the molded part.

It has now been discovered that the addition of a carboxy terminated polystyrene oligomer lowers melt viscosity and essentially maintains to a significant extent a substantial number of its other properties such as flexural and tensile measurements as well as DTUL and impact resistance. Although the structure(s) of the composition is not known with certainty it is believed that ester interchange occurs to some extent between the carboxy terminated polystyrene and the amorphous aromatic polyester, thereby forming a new molecule. It is also believed that present in the new composition is an intimate admixture of the two components.

SUMMARY OF THE INVENTION

In accordance with the invention there is a process which comprises mixing a melt of an amorphous aromatic polyester with a melt of a carboxy terminated polystyrene oligomer, said oligomer having a number average molecular weight of from about 500 to about 10,000.

A further aspect of the invention is compositions prepared from the above process.

Another aspect of the invention is a composition comprising an admixture of an amorphous aromatic polyester and a carboxy terminated polystyrene oligomer having a number average molecular weight of from about 500 to about 10,000.

A still further aspect of the invention is a copolymer selected from the group consisting of HOOC-poly

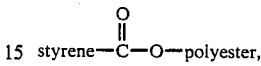

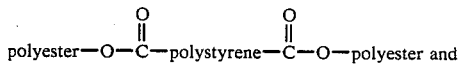

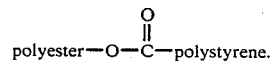

DETAILED DESCRIPTION OF THE INVENTION

The amorphous aromatic polyesters suitable for this invention include the polycarbonates, copolyestercarbonates, polyarylates and polycycloalkylene phthalates. The aromatic polycarbonate resins suitable for use herein as component (a) may be prepared by reacting a dihydric phenol with a carbonate precursor, such as phosgene, a haloformate or a carbonate ester. Typically, such carbonate polymers are represented as comprising recurring structural units of the formula:

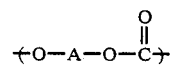

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.70 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:

2,2-bis-(4-hydroxyphenyl)propane;
hydroquinone;
resorcinol;
2,2-bis-(4-hydroxyphenyl)pentane;
biphenol
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxyphenyl)sulfone;
bis-(3,5-dimethyl-4-hydroxyphenyl)sulfone;
2,2-bis-(3,5-dimethyl-4-hydroxyphenyl)propane;
2,4'-dihydroxydiphenyl sulfone;

5'-chloro-2,4'-dihydroxydiphenyl sulfone;
bis-(4-hydroxyphenyl)diphenyl sulfone;
4'4'-dihydroxydiphenyl ether;
4,4'-dihydroxy-3,3'-dichlorodiphenyl ether;
4,4'-dihydroxy-2,5-dimethyldiphenyl ether; and the like.

Other dihydric phenols which are also suitable for use in the preparation of the above polycarbonates are disclosed in U.S. Pat. Nos. 2,999,835; 3,038,365; 3,334,154 and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. Nos. 4,018,750 and 4,123,426, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy- or acid-terminated polyester or with dibasic acids in the event a carbon ate copolymer or interpolymer rather than a homopolymer is desired for use in the preparation of the polycarbonate mixtures of the invention. Branched polycarbonates are also useful, such as are described in U.S. Pat. No. 4,001,184. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use as component (a) herein is a homopolymer derived from 2,2-bis(4hydroxyphenyl)propane (bisphenol-A).

The aromatic copolyestercarbonates which can be employed in this invention include those aromatic polymers with ester and carbonate repeating units as those found in U.S. Pat. Nos. 3,169,121; 4,287,787; 4,156,069; 4,260, 731 and the like, each incorporated by reference. Of the aforementioned polymers, the polymers utilizing bisphenol-A as the dihydric phenol are preferred. Methods for preparing the polymers are well known and are described in the references cited above.

Polyarylates are polymers having all ester bonds. They are generally prepared from dihydric phenols and phthalic acids although any aromatic diacid or diphenol can be employed. These polymers and their methods of preparation are well known and are available commercially, for example under the tradename ARDEL from AMOCO. The dihydric phenol preferably employed is bisphenol-A and the aromatic diacid is terephthalic, isophthalic or a combination of the two.

The polycycloalkylene phthalates are typically the cis or trans 1,4-cyclohexane dimethanol based molecules wherein the diacids are terephthalic, isophthalic or a mixture thereof. Such polymers are available from Eastman Chemical under such tradenames as KODAR A150 (trans 1,4-cyclohexane dimethanol with 50:50 isophthalic and terephthalic acids as well as PCTG (1,4-cyclohexane dimethanol, terephthalic acid and ethylene glycol). Generally linear diols may be employed up to about 50 mole percent of the diol units or up until the point that the polymer still remains amorphous. Examples of such diols include diols of two to ten carbon atoms such as ethylene glycol, butane 1,4-diol and the like.

The polystyrenes employed are those oligomers wherein there is a vinyl aromatic unit therein. Examples of such vinyl aromatic units are styrene per se, para methyl styrene, alpha methyl styrene and other like monomers. The substituent on the ring or the vinyl grouping need not be limited to methyl but may be an alkyl group from 1 to 6 carbon atoms inclusive, normal or branched such as ethyl, propyl, isopropyl, tertbutyl and 2,2-dimethylbutyl. Ring substituents may also be halogens, especially bromine or chlorine. The polystyrenes need not be made up of all vinyl aromatic units, but may be combined with monomers which can be combined into the oligomers by polymerization initiated by a radical transfer mechanism. Such monomers include acrylonitrile, methacrylate, alkydienes such as butadiene and isoprenes, and other like moieties. Examples of polystyrenes useful in the invention include polystyrene per se, polyalpha methyl styrene, polypara methylstyrene, acrylonitrile styrene, methacryloyl styrene, butadiene styrene selectively hydrogenated or not, styrene-butadiene-styrene block copolymers selectively hydrogenated or not, and other similar molecules. When there is other than a vinyl aromatic monomer present in the polymer there is from about 20 to about 90 mole percent of the polymer being the vinyl aromatic. Preferably, 50 mole percent or more of the molecule is the vinyl aromatic unit.

The polystyrene oligomers are prepared by polymerization methods which also provide a carboxy end group. A preferred method of preparation is through a radical transfer mechanism. In this manner not only are the styrenes polymerized but the oligomeric chains are terminated with a carboxy group as well. The chain transfer agent employed in these preparations is a mercaptan having a terminal carboxylic acid or carboxylic anhydride group. Examples of such chain transfer agents include

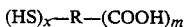

$(HS)_x-R-(COOH)_m$ wherein x is 1 or 2, m is 1, 2 or 3 and R is alkylene of one to ten carbon atoms, inclusive, phenylene or mono or dialkyl substituted phenylene and

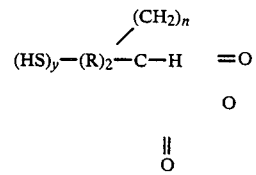

wherein y is 1 or 2, n is 0, 1, or 2 and R is as defined above, 2 is 0 or 1. For the figures above preferably x and y are 1, m is 1 or 2, n is 1 or 2 and R is methylene or ethylene. Through the chain transfer reaction, the chain transfer agent becomes an endgroup and is referred to as the "carboxy" end group throughout the specification and claims because the carboxy terminates the polystyrene oligomer chain and is capable of reaction with the polyester. Preferred radical transfer agents are mercapto succinic acid, mercaptopropionate, thio lactic acid, thiobenzoic acid and thiosalicylic acid.

The carboxy terminted polystyrene oligomer generally has a number average molecular weight from about 500 to about 10,000, preferably from about 1,000 to about 8,000. Such oligomers are available commercially from Toagosei Chemical Industry Company Limited.

The particular material, MDC 5St, from Toagosei is a carboxy terminated polystyrene oligomer of a number average molecular weight of about 5,000.

The polystyrene is utilized in quantities sufficient to lower the melt viscosity of the composition. It is preferred to use a minimum of the polystyrene so as to retain a substantial number of the physical properties of the amorphous aromatic polyester at or near the normal values. Examples of such physical properties include transparency, Notched Izod impact resistance and various moduluses such as tensile and flexural as well as DTUL. Generally no more than about 5 weight percent of the polystyrene will accomplish the positive atributes of the invention while maintaining a substantial number of the physical properties at or near their normal values. When using a higher molecular weight polyester such as polycarbonate with an IV of greater than 1.0 dl/g at 25° C. methylene chloride and/or a higher molecular weight polystyrene, 9,000 to 10,000, the composition can accept a higher weight percent of the polystyrene.

The polystyrene weight percent may be as much as 15 or 20 weight percent of the polystyrene and amorphous aromatic polyester if one does not wish to preserve the values of a substantial number of the physical properties. The minimum amount of polystyrene necessary to reduce the melt viscosity can be employed. Generally from about 0.5 to about 5.0 weight percent of polystyrene is enough to observe a significant decrease in melt viscosity.

As previously mentioned, the carboxy terminated polyacrylate is mixed with the amorphous aromatic polyester generally under dry blend conditions and then coextruded together to form the admixture and new copolymer. Extrusion temperatures employed are those which render the composition thermoplastic. Molding conditions to form a shaped article are those sufficient to make thermoplastic the composition for purposes of shaping in the mold, for example molding temperatures of 500°-570° F. will most likely be satisfactory.

The following examples are presented to more fully and clearly illustrate the invention. Although the examples set forth the best mode presently known to practice the invention they are intended to be and should be considered as illustrative rather than limiting the invention. In the examples, all parts and percentages are by weight unless otherwise specified.

EXAMPLES

The properties shown in the Tables below are measured in the following manner:
Tensile strength: ASTM D638.
Tensile elongation: ASTM D638.
Flexural strength: Flexural modulus: ASTM D790.
DTUL @264 psi: ASTM D648.

Impact testing:
Notched Izod:
Un-notched Izod: all by ASTM D256
Double gate Izod % Transmittance and % Haze: ASTM D1003.

The measurement of the melt viscosity was made by using the Kasha Index (KI) which is done in the following manner:

The procedure for determining the Kasha Index is as follows: 7 grams of resin pellets, dried a minimum of 90 minutes at 125° C. are added to a modified TiniusOlsen model T3 melt indexer; the temperature in the indexer is maintained at 300° C. and the resin is heated at this temperature for 6 minutes; after 6 minutes the resin is forced through a 1.05 mm radius orifice using a plunger of radius 4.7 mm and an applied force of 7.7 kgs. The time required for the plunger to travel 5.1 cm is measured in centiseconds; this is reported as the KI. The higher the KI, the higher the melt viscosity and the more viscous the resin, and the harder or more difficult the processability.

All of the examples use also 0.03 weight percent of tris-(ditert butyl)phenyl phosphite. The examples were extruded at a temperature of from about 250 to 300° C. The bisphenol-A polycarbonate in Table I had an I.V. of about 0.55–0.58, and in Table II and III an I.V. of about 0.52–0.55.

The polystyrene oligomers in Table I and II, MDC-5T is acid endcapped (anhydride), has a number average molecular weight of 5000 and is obtained from Toagosei.

The polystyrene oligomer in Table III, MDC-5AS is 75 mole percent styrene and 25 mole percent acrylonitrile, has a number average molecular weight of 5000 and is obtained from Toagosei.

TABLE I

| EXAMPLE | A | 1 | 2 | 3 | 4 |
|---|---|---|---|---|---|
| FORMULATION | | | | | |
| LEXAN ® 135 | 100 | 99 | 98 | 95 | 90 |
| MDC-5T | — | 1 | 2 | 5 | 10 |
| PROPERTY | | | | | |
| Tens. | | | | | |
| Yield | 9400 | 9500 | 9500 | 9600 | 8300 |
| Break | 14,000 | 13,700 | 14,600 | 5000 | 2700 |
| Elong. | 110 | 106 | 117 | 55 | 12 |
| Flex. | | | | | |
| Yield | 13,700 | 13,800 | 13,800 | 14,200 | 14,200 |
| Mod. | 316,800 | 318,900 | 320,600 | 333,300 | 343,300 |
| DTUL | 130 | 135 | 136 | 134 | 131 |
| $\frac{1}{8}''$ | | | | | |
| N. Izod ft-lbs/in | $17.1^{100}$ | $17.2^{100}$ | $16.1^{100}$ | $3.1^0$ | $5.3^0$ |
| Un. Izod ft-lbs/in | >80 | >80 | >80 | >80 | $29.3^{100}$ |
| $\frac{1}{4}''$ N. Izod ft-lbs/in | $4.3^0$ | $2.8^0$ | $2.4^0$ | $2.0^0$ | $2.2^0$ |
| D.G. Izod ft-lbs/in | >80 | >80 | $25.4^{80}$ | $2.3^0$ | $1.0^0$ |
| 300° KI (csec) | 11360 | 11570 | 10760 | 6950 | 2920 |
| % Haze | 1.5 | 2.4 | 3.1 | 35.8 | 33.4 |
| % T | 89.9 | 88.0 | 84.4 | 85.6 | 82.4 |

TABLE II

| EXAMPLE | B | 5 |
|---|---|---|
| FORMULATION | | |
| LEXAN ® 105 | 100 | 85 |
| MDC-5T | — | 15 |
| PROPERTY | | |
| Tens. | | |
| Yield psi | 9200 | no yield |
| Break psi | 12,200 | 8200 |
| Elong. % | 109 | 4 |
| Flex. | | |
| Yield psi | 14,100 | 14,300 |
| Mod. psi | 345,100 | 357,500 |
| DTUL °C., @ 264 psi | 129 | 125 |
| $\frac{1}{8}''$ | | |
| N. Izod ft-lbs/in | $17.2^{100}$ | $3.9^0$ |
| Un. Izod ft-lbs/in | >80 | $10.9^{100}$ |
| $\frac{1}{4}''$ N. Izod ft-lbs/in | $2.6^0$ | $1.1^0$ |
| D.G. Izod ft-lbs/in | $45.8^{100}$ | $0.9^0$ |
| KI | | |
| (6 min) csec | 3440 | 620 |
| (12 min) csec | 3320 | 470 |

TABLE II-continued

| EXAMPLE | B | 5 |
| --- | --- | --- |
| % Transmittance | 88 | 88 |
| % Haze | 1.3 | 9.8 |

TABLE III

| EXAMPLE | C | 6 | 7 | 8 | 9 |
| --- | --- | --- | --- | --- | --- |
| FORMULATION | | | | | |
| LEXAN ® 105 | 100 | 99 | 98 | 95 | 90 |
| MDC-5AS | — | 1 | 2 | 5 | 10 |
| PROPERTY | | | | | |
| Tens. | | | | | |
| Yield psi | 9100 | 9300 | 9400 | 9700 | 10,000 |
| Break psi | 13,000 | 12,700 | 13,100 | 13,200 | 11,900 |
| Elong. % | 116 | 108 | 114 | 117 | 99 |
| Flex. | | | | | |
| Yield psi | 14,100 | 14,200 | 14,200 | 14,700 | 15,000 |
| Mod. psi | 337,100 | 336,100 | 344,400 | 351,800 | 358,700 |
| DTUL °C., @ 264 psi | 131 | 130 | 132 | 129 | 130 |
| $\frac{1}{8}''$ | | | | | |
| N. Izod ft-lbs/in | $17.7^{100}$ | $17.9^{100}$ | $17.5^{100}$ | $2.3^0$ | $1.5^0$ |
| Un. Izod ft-lbs/in | >80 | >80 | >80 | >80 | >80 |
| $\frac{1}{4}''$ N. Izod ft-lbs/in | $2.7^0$ | $2.5^0$ | $2.2^0$ | $1.7^0$ | $1.1^0$ |
| D.G. Izod ft-lbs/in | $51.7^{100}$ | $48^{100}$ | $46.3^{100}$ | $10.5^0$ | $2.2^0$ |
| 300° KI (6 min) csec | 5330 | 4760 | 4500 | 3620 | 1280 |

What is claimed is:

1. A composition prepared from a process which comprises mixing a melt of an amorphous aromatic polyester with a melt of a carboxy terminated polystyrene oligomer, said oligomer having a number average molecular weight of from about 500 to 10,000.

2. The composition in accordance with claim 1 wherein the polyester is polycarbonate, copolyestercarbonate, polyarylate, or polycycloalkylene phthalate.

3. The composition in accordance with claim 2 wherein the polyester is aromatic polycarbonate.

4. The composition in accordance with claim 3 wherein the polycarbonate is bisphenol-A polycarbonate.

5. The composition in accordance with claim 1 wherein the monomer comprising the oligomer is styrene, methylstyrene or p-methylstyrene.

6. The composition in accordance with claim 5 wherein the polystyrene has a further comonomer which is not a vinyl aromatic.

7. The composition in accordance with claim 6 wherein the said comonomer is acrylonitrile, acrylate, methacrylate or an alkadiene.

8. The composition in accordance with claim 7 wherein the styrene monomer is from about 20 to 90 mole percent of the oligomer.

9. The composition in accordance with claim 8 wherein the styrene monomer is at least about 50 mole percent of the oligomer.

10. The composition in accordance with claim 9 wherein the oligomer is 25 mole percent acrylonitrile and 75 mole percent styrene and the polyester is bisphenol-A polycarbonate.

11. The composition in accordance with claim 5 wherein the oligomer monomer is styrene and the polyester is bisphenol-A polycarbonate.

12. A composition comprising an admixture of an amorphous polyester and a carboxy terminated polystyrene oligomer, said oligomer having a number average molecular weight of from about 500 to 10,000.

13. The composition in accordance with claim 12 wherein the polyester is polycarbonate, copolyestercarbonate, polyarylate, or polycycloalkylene phthalate.

14. The composition in accordance with claim 13 wherein the polyester is aromatic polycarbonate.

15. The composition in accordancd with claim 14 wherein the polycarbonate is bisphenol-A polycarbonate.

16. The composition in accordance with claim 12 wherein the monomer comprising the oligomer is styrene, α methylstyrene or p-methylstyrene.

17. The composition in accordance with claim 16 wherein the polystyrene has a further comonomer which is not a vinyl aromatic.

18. The composition in accordance with claim 17 wherein the monomer is acrylonitrile, acrylate, methacrylate or an alkadiene.

19. The composition in accordance with claim 18 wherein the styrene monomer is from about 20 to 90 mole percent of the oligomer.

20. The composition in accordance with claim 19 wherein the styrene monomer is at least about 50 mole percent of the oligomer.

21. The composition in accordance with claim 20 wherein the oligomer is 25 mole percent acrylonitrile and 75 mole percent styrene and the polyester is bisphenol-A polycarbonate.

22. The composition in accordance with claim 15 wherein the oligomer monomer is styrene and the polyester is bisphenol-A polycarbonate.

23. The composition in accordance with claim 12 wherein the polystyrene oligomer is terminated with mercapto succinic acid.

24. The composition in accordance with claim 1 wherein the oligomer is from about 0.5 to about 2 weight percent of the weight of the polyester and the oligomer.

25. The composition in accordance with claim 11 wherein the styrene oligomer is from about 0.5 to about 2 wt. percent of the styrene oligomer and bisphenol-A polycarbonate.

26. The composition in accordance with claim 1 wherein the oligomer is from about 0.5 to about 10 wt. percent of the weight of the polyester and the oligomer.

27. The composition in accordance with claim 12 wherein the oligomer is from about 0.5 to about 10 wt. percent of the polyester and oligomer.

28. The composition in accordance with claim 27 wherein the oligomer is from about 0.5 to about 2 wt. percent of the oligomer and polyester.

29. The composition in accordance with claim 22 wherein the styrene oligomer is from about 0.5 to about 2 wt. percent of the styrene oligomer and the bisphenol-A polycarbonate.

* * * * *